(12) United States Patent
Yu et al.

(10) Patent No.: US 10,125,272 B2
(45) Date of Patent: Nov. 13, 2018

(54) THERMOCHROMIC COATINGS, FILMS AND MATERIALS FOR THERMAL MANAGEMENT

(71) Applicant: CASE WESTERN RESERVE UNIVERSITY, Cleveland, OH (US)

(72) Inventors: Xiong Yu, Beachwood, OH (US); Jianying Hu, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 58 days.

(21) Appl. No.: 15/094,135

(22) Filed: Apr. 8, 2016

(65) Prior Publication Data

US 2016/0297975 A1 Oct. 13, 2016

Related U.S. Application Data

(60) Provisional application No. 62/144,494, filed on Apr. 8, 2015.

(51) Int. Cl.
*C09D 5/26* (2006.01)
(52) U.S. Cl.
CPC ..................... *C09D 5/26* (2013.01)
(58) Field of Classification Search
USPC ............... 427/145, 331, 2.31; 252/586, 500; 106/31.6
See application file for complete search history.

(56) References Cited

U.S. PATENT DOCUMENTS

| | | | | |
|---|---|---|---|---|
| 2006/0051425 A1* | 3/2006 | Kvitnitsky | ........... | A61K 9/0014 424/490 |
| 2007/0255189 A1* | 11/2007 | Halanski | ................... | A61F 5/01 602/8 |
| 2010/0170601 A1* | 7/2010 | Ohashi | ................ | B60C 11/0309 152/209.15 |
| 2013/0177703 A1* | 7/2013 | Clayton | ................. | C09D 11/50 427/145 |

OTHER PUBLICATIONS

Hu, J.Y. and Yu, X., Experimental Study of Sustainable Asphalt Binder: Influence of Thermochromic Materials, Transportation Research Record, (2013a) Issue No. 2372, pp. 108-115.
Hu, J.Y. and Yu, X., Innovative Chromogenic Materials for Pavement Life Extension: Modeling Study of Surface Temperature of Sustainable Asphalt Pavement, International Journal of Pavement Research and Technology, Mar. 15, 2013, vol. 6, Issue 2, pp. 141-146.

* cited by examiner

*Primary Examiner* — Monique R Peets
(74) *Attorney, Agent, or Firm* — Hudak, Shunk & Farin Co., LPA

(57) ABSTRACT

Thermochromic coatings, films and materials that aid in a) reducing surface temperature of a structure or composite material when environmental temperature is relatively high and b) increasing surface temperature under relatively low environmental temperature. Surface temperature modulation is achieved using a synergistic combination of thermochromic materials and light scattering components.

6 Claims, 10 Drawing Sheets

THERMOCHROMIC COATINGS, FILMS AND MATERIALS FOR THERMAL MANAGEMENT

GOVERNMENT LICENSE RIGHTS

This invention was made with government support under Grant CMMI1537289 awarded by the National Science Foundation. The government has certain rights in the invention.

FIELD OF THE INVENTION

The present invention relates to thermochromic coatings, films and materials that aid in a) reducing surface temperature of a structure or composite material when environmental temperature is relatively high and b) increasing surface temperature under relatively low environmental temperature. Surface temperature modulation is achieved using a synergistic combination of thermochromic materials and light scattering components.

BACKGROUND OF THE INVENTION

Countless materials and structures are exposed to the environment and are thus affected by temperature. Temperature extremes such as high temperatures or low temperatures can impair long-term durability of materials, but also can lead to undesirable environmental impacts, such as heat island effects and volatile gas emissions. Temperature fluctuations can also lead to high energy consumption and HVAC cost for buildings, vehicles (including electrical vehicles, where HVAC consumes electricity and significantly reduces the mileage ranges). Non-limiting examples of suitable structures or materials that could benefit from thermal management could include, but are limited to, asphalt or pavement; building materials, such as roofing material, siding, and building envelopes; and vehicles, etc.

Many materials, due to their composition or structure, are prone to solar absorption which leads to relatively high surface temperatures.

Thermochromic materials have been added to asphalt binders as solar reflectors in order to modulate surface temperature of asphalt pavement. Discussions regarding the same are set forth in (Hu and Yu 2013a, 2013b):

Hu, J. Y. and Yu, X. (2013a). Experimental Study of Sustainable Asphalt Binder: Influence of Thermochromic Materials, *Transportation Research Record*, Issue Number: 2372, pp 108-115.

Hu, J. Y. and Yu, X. (2013b). Innovative Chromogenic Materials for Pavement Life Extension: Modeling Study of Surface Temperature of Sustainable Asphalt Pavement, *International Journal of Pavement Research and Technology*, March 2013, Volume 6, Issue 2, pp 141-146.

Temperature plays a major role on asphalt durability under both hot and cold weather conditions (Shami et al. 1997). For example, Huang et al. (2008) showed that the rutting typically occurred when the surface temperature of asphalt pavement is above 20° C.; the higher the surface temperature the higher the potential of rutting occurrence. Increase of surface temperature by 10° C. accelerated permanent plastic strain by 40 times. On the other side, low temperature crack is a major pavement distress in cold regions.

The black color of conventional asphalt corresponds to large solar absorbance and large emissivity. This makes it warm up fast under solar radiation and cool down fast under sudden temperature drop. Studies (Santamouris et al. 2007, Synnefa et al. 2008, Doulos et al. 2004) measured the surface temperature of asphalt pavement as high as 48-67° C. during summer. The elevated temperature during summer impacts durability of asphalt pavement by accelerating various distresses (i.e., rutting, bleeding, shoving, aging, fatigue damage) (Yoder and Witzak 1975). The high surface temperature also exacerbates the urban heat island effects and accelerates volatile emission. Cool pavement technology has been proposed that use materials with high reflectivity to solar radiation. Studies (Pomerantz et al. 2000, 2004) show that cool pavement, which features low surface temperatures, increases the service life of pavements. However, as the conventional cool pavement technologies reduce the surface temperature of pavement regardless of the season, the reduced temperature of asphalt pavement exacerbates the problem with low temperature cracking during the winter period (Hao et al. 2000, Kanerva and Zeng 1994). Besides, the lower surface temperature is inductive to ice formation, which impairs road safety and winter road maintenance. Similar issues are found for common types of cool roof technologies, which while reduce the energy consumption during summer but increase the energy consumption during winter, and therefore increase energy consumption for buildings located in heating dominant regions.

The temperature of the road surface is affected by three major thermal exchange mechanisms: absorption of the incident solar energy, thermal radiation to the atmosphere, and thermal convection with the air close to the roads surface. The direct source of heat for pavement comes from solar radiation. The surface temperature on roads can be unpleasantly high during summer (EPA 2009). Solar Reflectance (SR)/Solar Absorbance (SA), or the percentage of solar energy reflected/absorbed by a surface, are the main determinant of a material's maximum surface temperature. Thermal Emittance (SE) determines how much heat it will radiate per unit area at a given temperature. Using the thermal transfer model by NIST (Bentz 2000), it was shown that when the ambient temperature is within 3 degrees below the surface temperature, the heat loss by thermal radiation/emission is the dominant factor over the heat loss by convection. Solar Reflectance has a major role on the maximum surface temperature while Thermal Emittance determines the minimum temperature (Levinson et al. 2002).

Among these two important properties, there are only limited options to change the thermal emittance because most pavement materials inherently have high emittance values. Changing the solar reflectance can have a major impact on the surface temperature of pavements. Golden and Kaloush (2004) showed that at the same solar input, changing the solar reflectance value from that of ordinary asphalt to that of concrete will result in at least 10 degree drop in the road temperature. This means a significant reduction of rutting, aging, and emission of volatiles from asphalt roads.

In view of the above, there is still a need for thermochromic coatings having relatively high solar reflectance when subjected to relatively high temperatures and lower solar reflectance when subjected to lower temperatures. In addition, economical coating materials are also sought by industry.

SUMMARY OF THE INVENTION

It is an object of the present invention to provide innovative thermochromics coatings, films and materials suitable for thermal management of various structures or materials.

Yet another object of the present invention is to provide thermochromic coatings exhibiting desirable infrared reflectance that aid in reducing surface temperature of a structure or material containing the coating when encountering relatively high temperatures and/or increasing the surface temperature of the structural material during relatively low temperatures.

Yet another object of the present invention is to provide thermochromic coatings including a matrix material, thermochromic materials that function as reflectors, and a light scattering components that distribute incident light within the coating thereby routing at least some of the light to the thermochromic materials. The use of light scattering components in the coating has been found to significantly improve efficiency of the coating material and therefore reduce the cost of the overall material.

Yet another object of the present invention is to provide methods for providing materials with thermal management, including the step of coating a structure or material with a thermochromic coating and/or incorporating the thermochromic coating within the structure or material.

Yet another object of the present invention is to provide methods for providing vehicles with thermal management, including the step of coating a vehicle with a thermochromic coating or film to reduce the thermal load for a HAVC system.

In one aspect a thermochromic material-containing composition is disclosed, comprising a thermochromic material comprising a leuco dye, a developer and a solvent; a light scattering component; and a matrix material, wherein the thermochromic material has a transition temperature that ranges from about 25° C. to about 35° C. Other transition temperatures are allowable depending upon the particular applications in certain regions.

In another aspect a thermochromic material-containing composition is disclosed, comprising a thermochroic material comprising a leuco dye, developer and solvent; a light scattering component; and a matrix composition.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Thermochromic materials are substances that can reversibly change their solar reflectance in response to temperature. Thermochromic materials can exhibit color change after crossing a transition temperature. The materials are designed to have, in one embodiment, high solar reflectance at high temperature, e.g. above 25 to 35° C. or other desirable temperature and low solar reflectance at low temperature, e.g. below 20° C. or other desirable temperature. Therefore, the materials can be utilized to improve thermal conditions encountered by a matrix polymer or material. The thermochromic material is incorporated into a coating composition comprising a light scattering component and matrix polymer or material.

The thermochromic coatings, films and composite material include thermochromic materials having a particular threshold temperature and reflectance spectra range in order to provide desired performance to a structure or composite material including a thermochromic coating or a film thereon or thermochromic material incorporated therein. It is also important to provide polymeric thermochromic materials that have good compatibility with a structure in contact therewith or in a composite material in which the thermochromic materials have been incorporated. As explained further herein below, encapsulation of the thermochromic materials reduces or prevents reactions with a structure or composite material into which the thermochromic material is incorporated under processing and service conditions.

Figure 13:
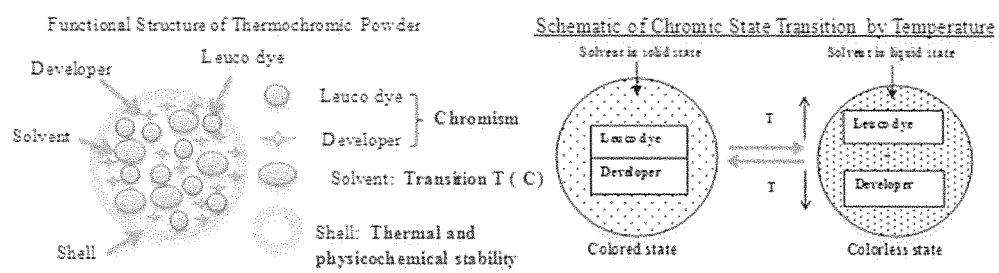
FIG. 13 illustrates a thermochromic mechanism based on encapsulated leuco dye.

The thermochromic materials of the present invention are organic mixtures, which include, in one embodiment, a dye, such as a leuco dye, a developer and a solvent. Leuco dye-based thermochromic materials are highly preferred as they are polymer based, have transition temperatures that can be adjusted by changing the melting point of the solvent, are encapsulated and provide good shielding against thermal and mechanical loads. FIG. 13 illustrates a schematic structure and thermochromic mechanism of a leuco dye-based thermochromic material system. The leuco dye serves as an electron donor and the developer an electron acceptor. Below a transition temperature, the leuco dye reacts with the developer and the absorption peak shifts from the UV to the visible range, and thus the material becomes colored and less solar reflective. At temperatures above the transition temperature, the solvent-developer interactions dominate, and the leuco dye is separated from the developer, which leads to loss of color and also higher solar reflection. The thermochromic materials according to the present invention generally have a transition temperature that ranges from about 25° C. to about 35° C., desirably from about 29° C. to about 33° C., and preferably about 31° C. In one embodiment, the thermochromic materials are encapsulated by trioctanoin or other encapsulating materials that maintain the structural integrity of the encapsulate and therefore at high temperatures the material becomes white or light-colored. The molecular structures of some suitable thermochromic materials and their changes below and above a transition temperature are shown below.

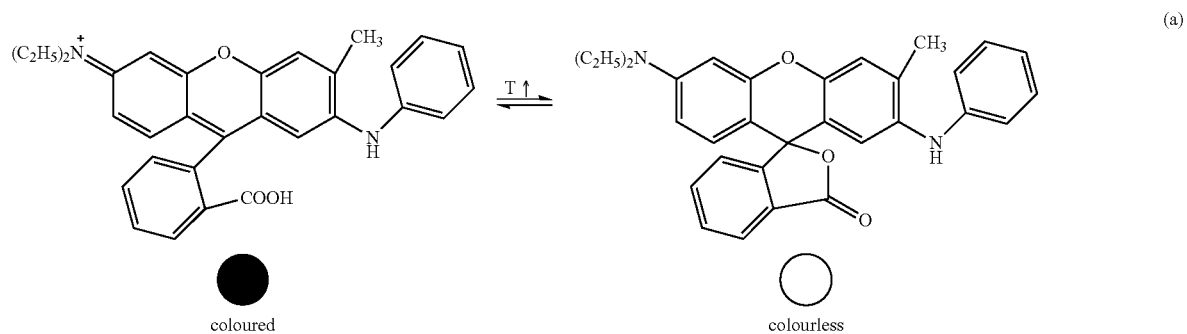

(a)

Colored = black color

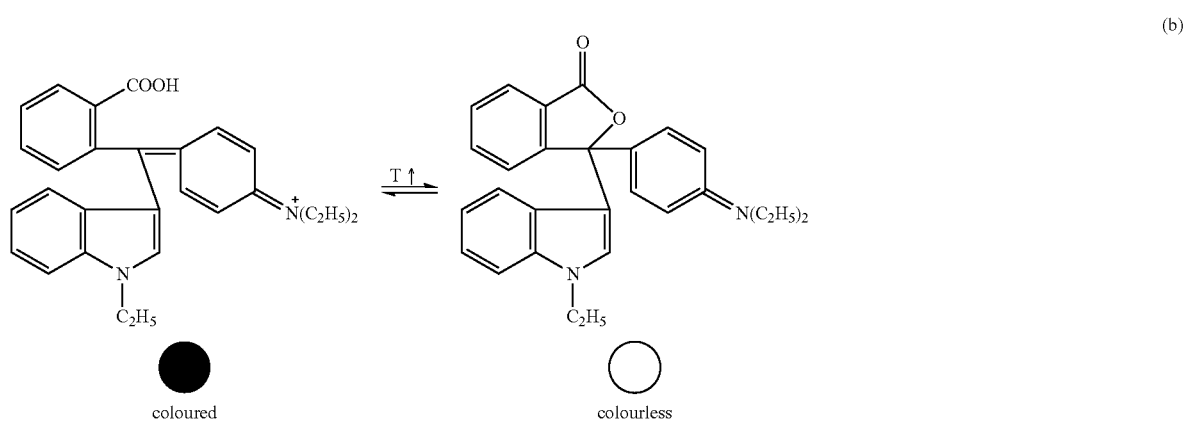

(b)

Colored = blue

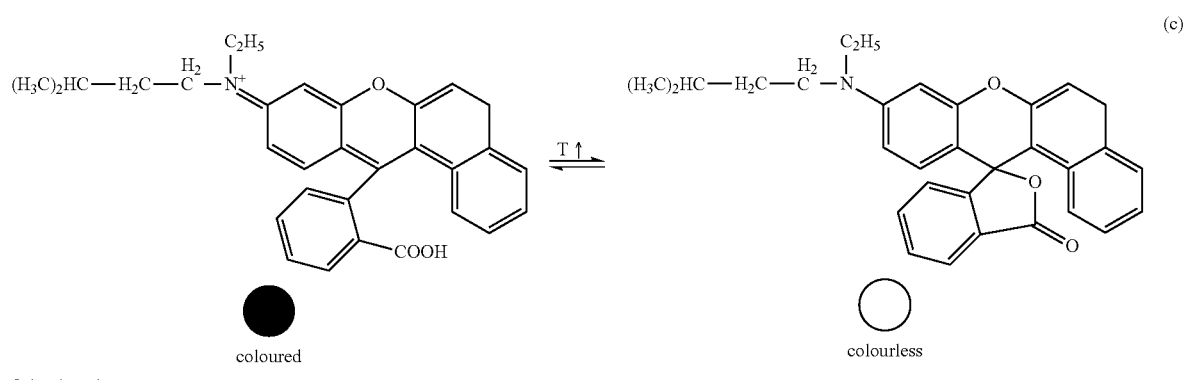

(c)

Colored = red

Examples of leuco dye include but are not limited to triphenylemethane, sulfur dyes and Indigo dyes. The color change components are protected with procedures such as microencapsulation.

Various amounts of thermochromic materials can be utilized, depending upon factors such as the composition matrix material polymer into which the thermochromic material is incorporated and amount of light scattering components present. That said, the amount of one or more thermochromic materials present in the thermochromic composition is generally from about 0.1 to about 6 parts based on a comprehensive consideration of the effectiveness in changing solar reflectance, influence on mechanical properties of matrix material, and the cost, etc. based on 100 total parts by weight of the composition, in one embodiment the thermochromic material, light scattering component and matrix polymer or material. From these, an optimal part by weight of the thermochromic material can be determined from a testing program.

In some embodiments, encapsulated thermochromic materials can be manufactured with in situ polymerization in an oil-in-water emulsion. A core solution can be prepared by mixing a leuco dye and developer with a liquid solvent at an elevated temperature above the melting point of the solvent, which is also the transition temperature of the thermochromic material. The core solution is then emulsified. A water soluble resin is dissolved in water to form a shell solution. The core solution is added into the shell solution and emulsified under sonication and heating.

Further, the core solution can be microencapsulated in some embodiments. A general type hardening solution, including those commonly used to initialize polymerization process, is added to break the emulsion and form a gel. This process converts shell materials into a crosslinked, network state and nonsoluble sediment, which encapsulates the core solution in microcapsules. Once cooled to ambient temperature, the solvent in the microcapsule becomes solid and the microcapsule can be further separated with a coarse-fritted filter. The microcapsules can be rinsed and dried, such as for 24 hours prior to use. A sieve can be used to aid in separation of the microcapsules as well.

Thermochromic materials are available from various sources and suppliers.

A light scattering component is also present in the thermochromic coating compositions of the present invention. By introducing light scattering components, the effectiveness of the thermochromic reflectors is improved, thereby lowering the amount of thermochromic materials that would otherwise be necessary to achieve a desired effect. Presence of the light scattering component aids in reducing the overall cost of the coating materials through the reduced usage of thermochromic material. It is believed that the light scattering components function by scattering light incident thereon within the composition, thereby increasing the odds that light reflected therefrom reaches the thermochromic material.

Non-limiting examples of light scattering components include, but are not limited to, titanium dioxide, micron sized ceramic particles, metal oxide particles, glass particles, etc.

The light scattering components scatter the light so that the chance of the light reaching thermochromics powders is significantly increased.

The light scattering component is present in the thermochromic coating composition in an amount that ranges generally from about 1 to about 10 parts, based on 100 total parts by weight of composition, in one embodiment, the thermochromic material, light scattering component and matrix polymer or material. The optimal content can be obtained by laboratory characterization experiments.

The matrix polymer or material can vary depending on the end use application. In some embodiments, as described herein, the thermochromic coating or film is a layer that is separate and distinct from a structural material to which the thermochromic coating is applied and effectively joined thereto. In other embodiments, the thermochromic coating may be mixed with or incorporated into an additional composite material and is not a distinct layer per se.

Various matrices can be utilized including, but not limited to, polymers such as polyvinylchloride (PVC); polyurethane; acrylic; a polyolefin such as HDPE, polypropylene or, polyethylene; polycarbonate, polyacrylonitrile (PAN); polyvinylpyrrolidone (PVP); polystyrene (PS); and polyvinyl alcohol (PVA); and binders such as asphalt binders. Asphalt binders generally comprise residuals from crude oil distillation processes.

The thermochromic material and light scattering components are preferably well dispersed within the matrix polymer or material in order to achieve desirable results. The thermochromic coating compositions per se can be applied directly to a surface of another structure or material and/or mixed with another material such as asphalt. Methods of application include, but are not limited to, addition of a prefabricated film to a substrate, spray coating, painting, etc.

As mentioned herein, the thermochromic materials of the invention can be utilized in road construction and added to asphalt and/or asphalt binders blended with asphalt. The thermochromic materials reduce the surface temperature of pavement during the summer and therefore can reduce rutting, bleeding, etc. The materials can increase the surface temperature of pavement during the winter, and therefore aid in mitigating low temperature cracking and can delay ice formation. The thermochromic materials improve durability, mitigate the negative environmental impacts of asphalt road, such as heat island effects, volatile gas admissions, etc. and facilitate winter road maintenance.

Figure 1:
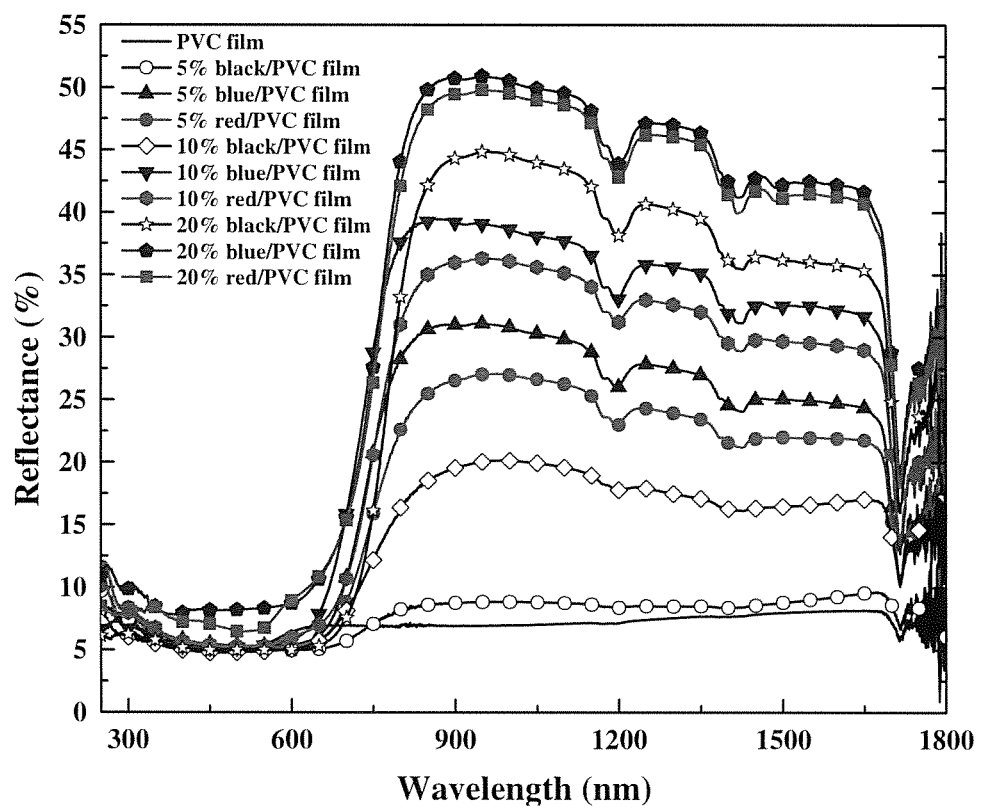
FIGS. 1 to 5 illustrate the influence of different variables on reflectance versus wavelength for a film, in particular PVC films.
Figure 2:
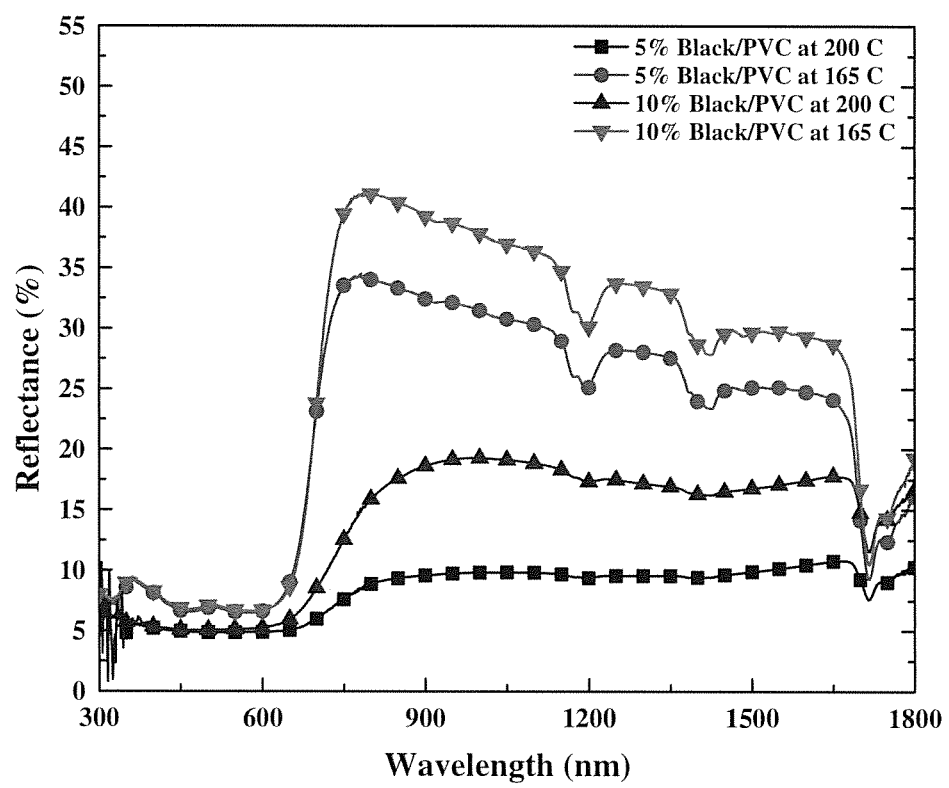
Figure 3:
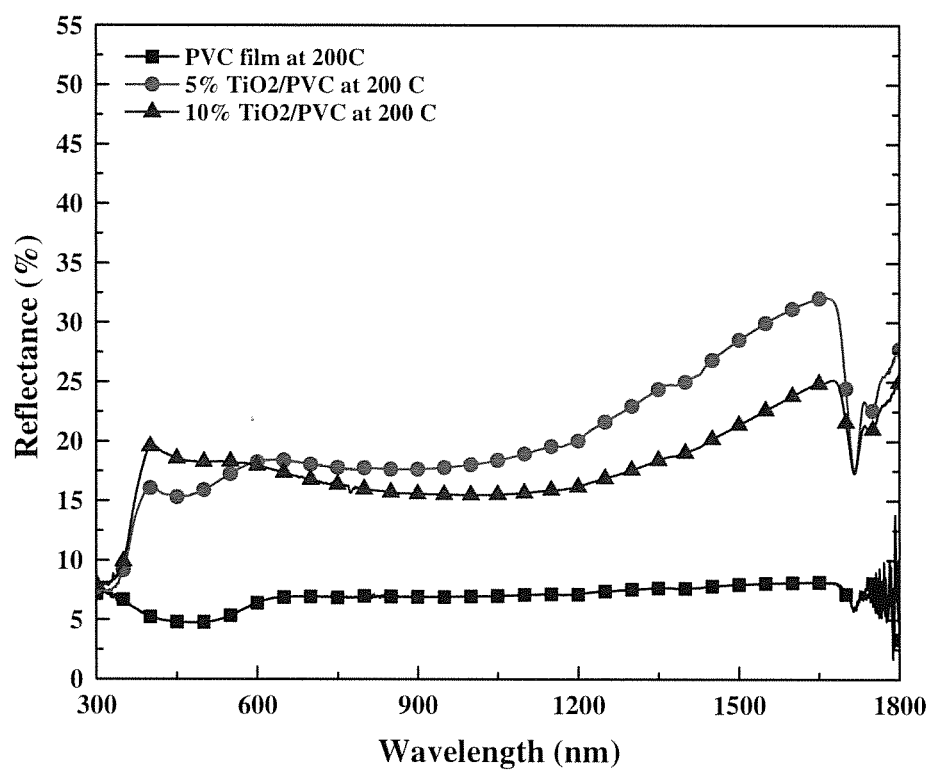
Figure 4:
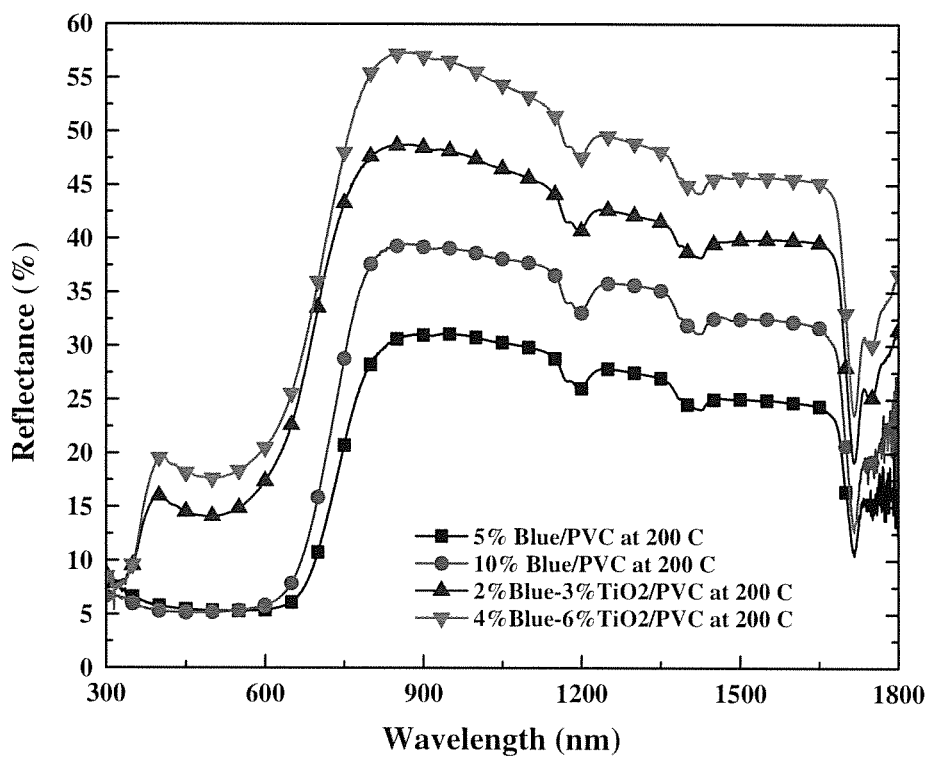
Figure 5:
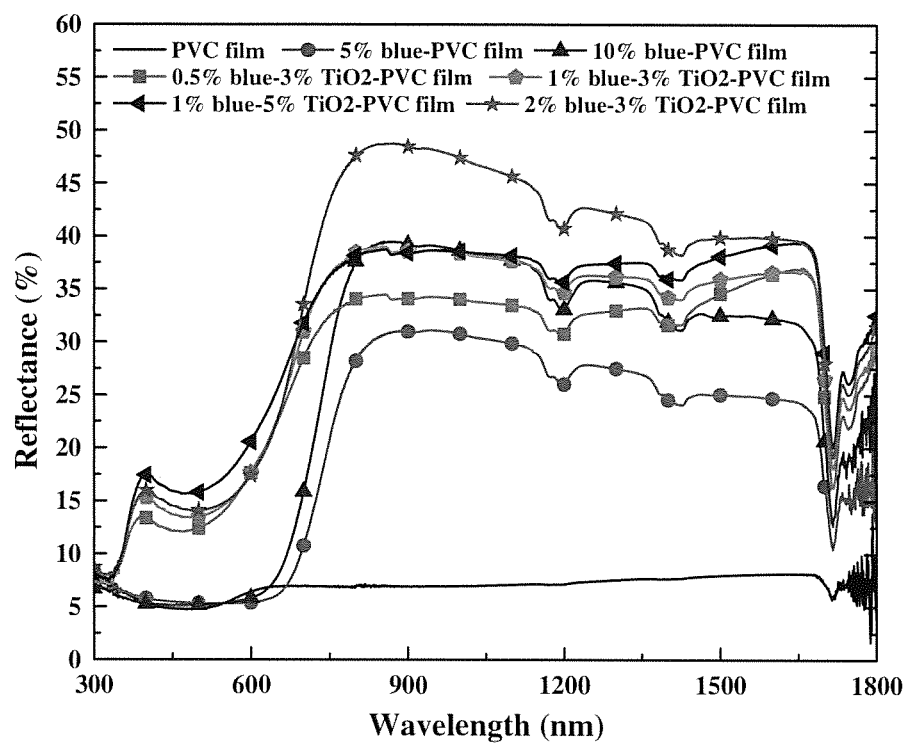
Figure 6:
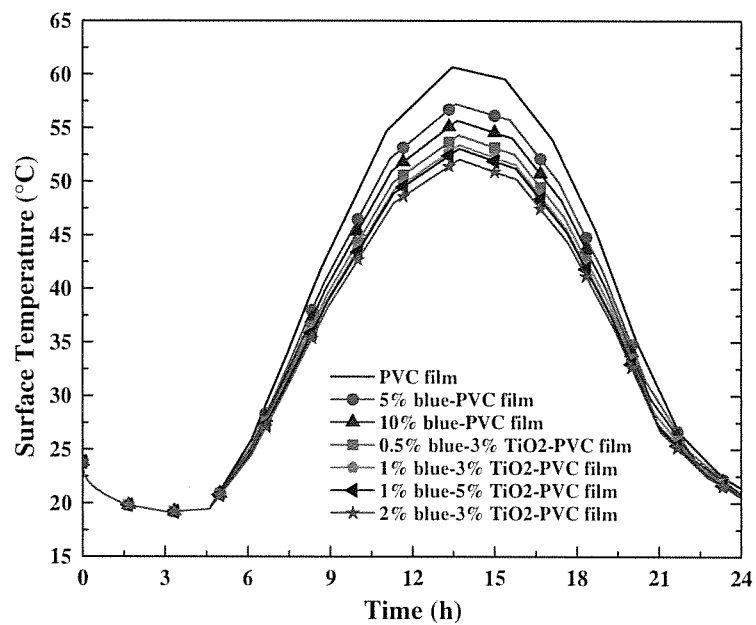
FIG. 6 illustrates a surface temperature versus time comparison of various compositions of coatings on a substrate, in particular asphalt concrete.
Figure 7:
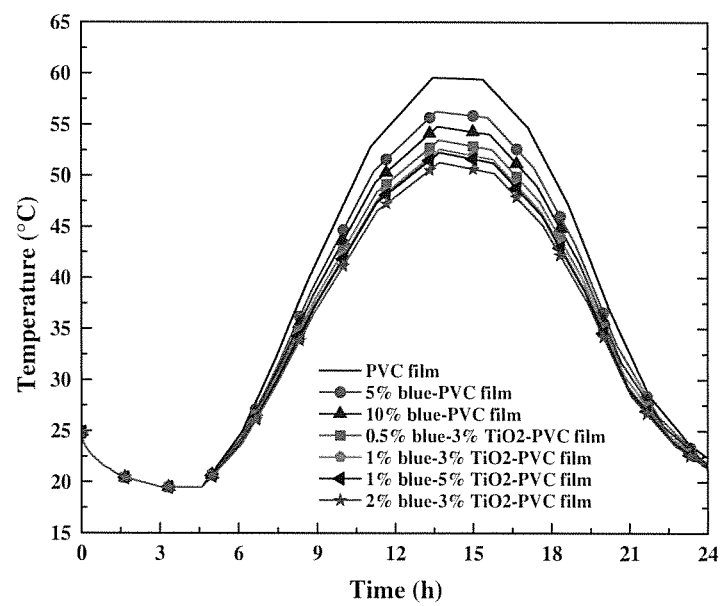
FIG. 7 illustrates a temperature versus time comparison between temperatures on a top surface of asphalt concrete coated with various coatings.
Figure 8:
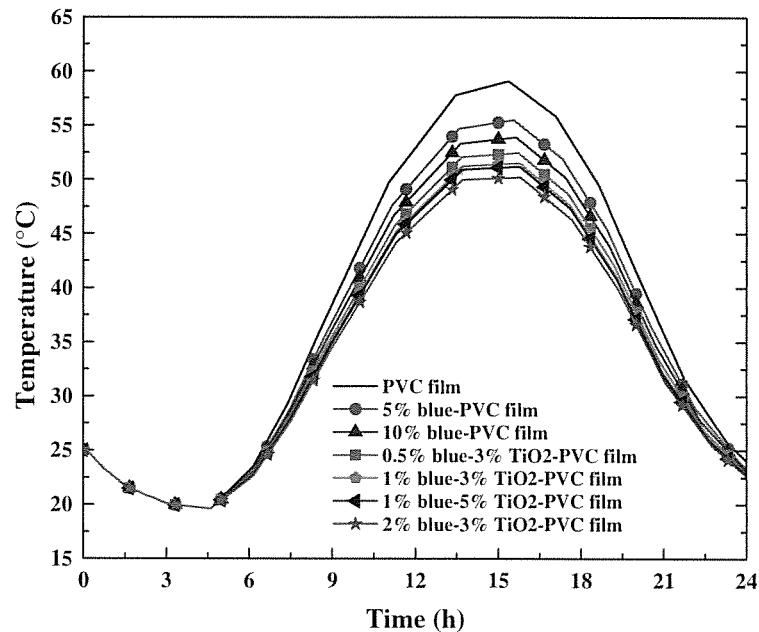
FIG. 8 illustrates a temperature versus time comparison between temperatures on a bottom surface of asphalt concrete coated with various coatings.
Figure 9:
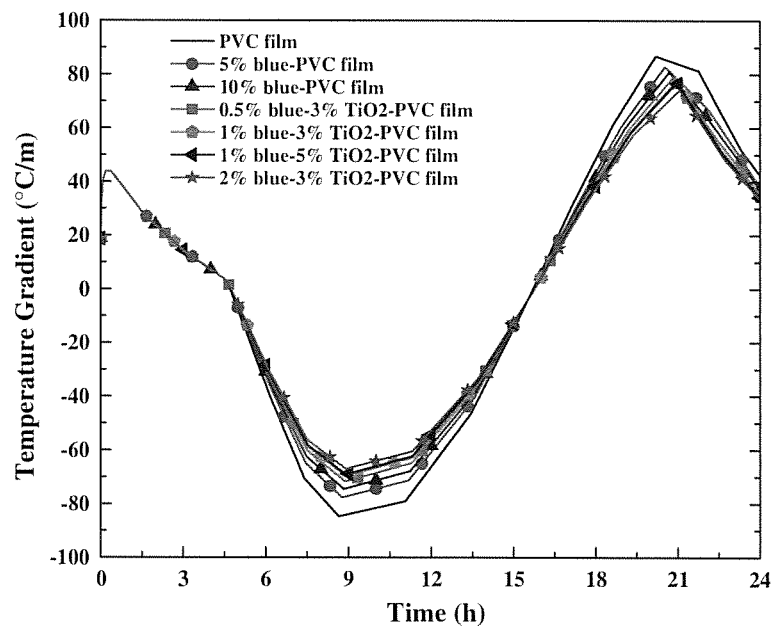
FIG. 9 provides a temperature gradient versus time comparison for various structures.
Figure 10:
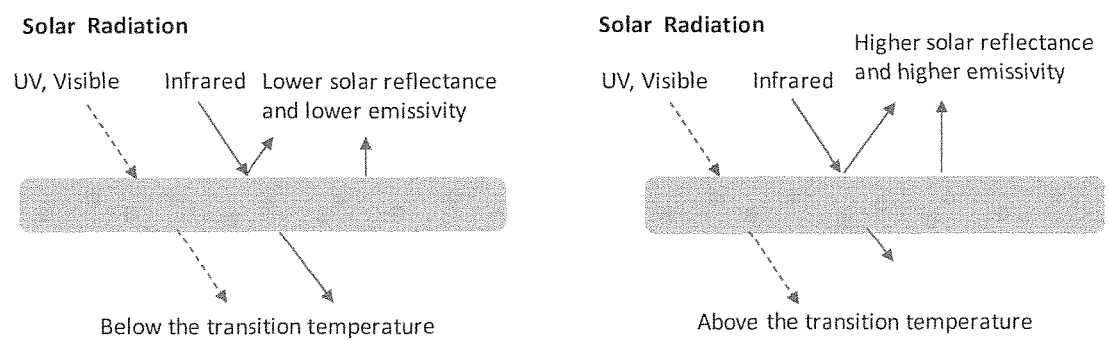
FIG. 10 schematically illustrates one embodiment of a thermochromic coating or film of the present invention and demonstrates that below the transition temperature, lower solar reflectance and lower emissivity are exhibited and, above the transition temperature, high solar reflectance and higher emissivity are exhibited.
Figure 11:
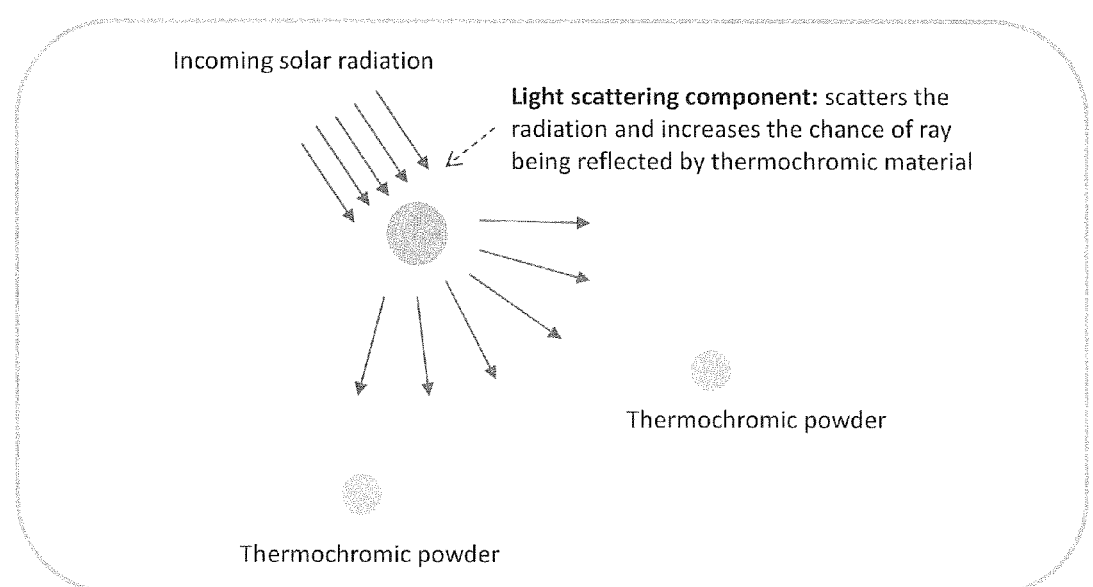
FIG. 11 schematically illustrates a coating including a light scattering component which scatters incident radiation and increases the chance of a ray being reflected by the thermochromic material above the transition temperature.
Figure 12:
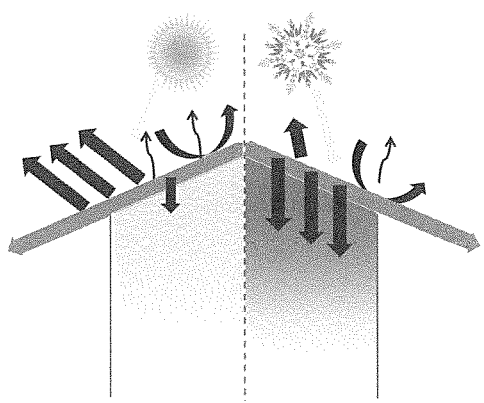
FIG. 12 schematically illustrates the function of a smart thermochromic coating with high solar reflection at high temperature on the left and high solar absorption at low temperature on the right.

In other embodiments, the thermochromic material can be used as a coating or film in building construction such as in conjunction with a roof, siding, or the like, As illustrated in FIG. 12, with respect to a roof, incorporating a thermochromic coating thereinto can save energy during the summer by providing high solar reflection at high temperatures. During the winter, the thermochromic material can help reduce energy consumption by allowing high solar absorption at low temperatures. In still other embodiments, thermochromic coatings or film are applied to an outer surface of a vehicle in order to make the vehicle cooler during summer and warmer during winter. Coatings can reduce the power requirements needed for air conditioning and heating. Reports indicate that the use of air conditioning can reduce the total mileage of electrical vehicles by 40 to 50%. Therefore, effective thermal management that reduces electricity consumption has major impact on the service of electrical vehicles.

The thermochromic powders and scatterers are mixed with polymer via proper mixing procedures that ensure the components are uniformly mixed into the matrix; and the function of thermochromic materials and light scatterers are retained. These mixing methods include, but are not limited to, mechanical mixing at high temperature; dissolving the coating components with a general polymer solvent and mixing in a liquid condition. The procedures need to be properly designed to ensure the functions of individual components are retained.

EXAMPLES

The examples set forth below serve to illustrate the compositions of the present invention and methods for forming the same. The examples are not intended to limit the scope of the invention. Thermochromic coating compositions of the present invention including the components set forth below where prepared by mixing resin of polymer matrix material, thermochromic powder, and light scattering particles properly proportioned. The film was prepared by hot press procedure. Comparative examples were prepared utilizing the same method.

The following raw materials were utilized for the examples.

| MATERIAL | SOURCE |
| --- | --- |
| PVC | Sigma Aldrich |
| BLACK | Hali |
| BLUE | Hali |
| RED | Hali |
| TIO$_2$ | DuPont |

The following test protocols were use for testing:

| Tests | Units | Procedure |
| --- | --- | --- |
| R$_{total}$ | % | ASTM E903 |
| RUV | % | ASTM E903 |

| Tests | Units | Procedure |
|---|---|---|
| RVIS | % | ASTM E903 |
| $R_{IR}$ | % | ASTM E903 |

ASTM E903-12. Standard test method for solar absorptance, reflectance, and transmittance of materials using integrating spheres. Technical Report, American Society for Testing and Materials, 2012.

Table 1 shows hot pressed PVC films with different recipes (i.e., percentage by weight of thermochromic powders, temperature for hot pressing), and the thickness of a hot pressed film produced.

Table 2 shows the measured total solar reflectance and solar reflectances in the UV, Visible and IR ranges of the prepared films following the procedures by ASTM E903. The general observation include 1) for the same thermochromic powder, the higher the concentration of thermochromics powder, the larger the change in the solar reflectance of the film compared with pure film; 2) with the use of light scatterer (such as TiO2), the film with low thermochromics powder concentration (such as 0.5% blue thermochromic powder) achieved much larger values of solar reflectance (larger than that by 5% of blue thermochromic powder). This illustrates the addition of light scatterer is a very effective strategy to increase the effectiveness of thermochromic film while significantly reducing the required thermochromic powder concentration (over 10 times reduction). Therefore, the invention presents a strategy to significantly reduce the cost of the thermochromic coating material.

TABLE 1

Thickness of PVC Films

| Sample | Thickness, mm | Sample | Thickness, mm |
|---|---|---|---|
| PVC film at 200° C. | 0.361 ± 0.004 | 5% TiO2/PVC at 200° C. | 0.272 ± 0.008 |
|  |  | 10% TiO2/PVC at 200° C. | 0.314 ± 0.019 |
| 5% black/PVC at 200° C. | 0.25 ± 0.012 | 5% black/PVC at 165° C. | 0.363 ± 0.013 |
| 5% blue/PVC at 200° C. | 0.258 ± 0.012 | 2% blue-3% TiO2/PVC at 200° C. | 0.275 ± 0.007 |
| 5% red/PVC at 200° C. | 0.264 ± 0.016 |  |  |
| 10% black/PVC at 200° C. | 0.273 ± 0.019 | 10% black/PVC at 165° C. | 0.367 ± 0.018 |
| 10% blue/PVC at 200° C. | 0.291 ± 0.005 | 4% blue-6% TiO2/PVC at 200° C. | 0.281 ± 0.017 |
| 10% red/PVC at 200° C. | 0.238 ± 0.01 |  |  |
| 20% black/PVC at 200° C. | 0.27 ± 0.033 |  |  |
| 20% blue/PVC at 200° C. | 0.265 ± 0.014 |  |  |
| 20% red/PVC at 200° C. | 0.289 ± 0.005 |  |  |

TABLE 2

Summary of solar reflectance values of various films

| Sample | $R_{total}$ (%) | RUV (%) | RVIS (%) | $R_{IR}$ (%) |
|---|---|---|---|---|
| PVC film at 200 C. | 6.46 | 6.37 | 5.65 | 7.17 |
| PVC film at 165 C. | 7.59 | 6.84 | 6.78 | 8.39 |
| PVC film at 180 C. | 7.73 | 7.20 | 7.00 | 8.45 |
| 5% black/PVC film | 6.77 | 6.04 | 5.10 | 8.32 |
| 5% blue/PVC film | 16.12 | 6.66 | 5.78 | 26.41 |
| 5% red/PVC film | 14.09 | 6.57 | 5.57 | 22.55 |
| 10% black/PVC film | 11.06 | 5.42 | 5.18 | 17.00 |
| 10% blue/PVC film | 20.16 | 5.95 | 6.31 | 34.18 |
| 10% red/PVC film | 18.17 | 6.63 | 6.02 | 30.35 |
| 20% black/PVC film | 20.30 | 5.65 | 5.16 | 35.49 |
| 20% blue/PVC film | 25.84 | 8.54 | 9.07 | 42.82 |
| 20% red/PVC film | 24.90 | 7.94 | 8.32 | 41.67 |
| 5% Black/PVC at 165 C. | 18.70 | 8.22 | 8.00 | 29.45 |
| 10% Black/PVC at 165 C. | 21.55 | 8.53 | 8.06 | 35.08 |
| 5% TiO2/PVC at 200 C. | 18.20 | 11.06 | 16.96 | 20.32 |
| 10% TiO2/PVC at 200 C. | 17.20 | 12.44 | 18.14 | 17.09 |
| 2% Blue-3% TiO2/PVC at 200 C. | 30.03 | 11.40 | 17.44 | 43.62 |
| 4% Blue-6% TiO2/PVC at 200 C. | 34.91 | 12.33 | 20.77 | 50.42 |
| 0.5% Blue-3% TiO2/PVC at 200 C. | 24.10 | 10.29 | 16.12 | 33.01 |
| 1% Blue-3% TiO2/PVC at 200 C. | 26.30 | 10.99 | 17.04 | 36.54 |
| 1% Blue-5% TiO2/PVC at 200 C. | 27.71 | 11.70 | 19.47 | 37.16 |

While in accordance with the patent statutes the best mode and preferred embodiment have been set forth, the scope of the invention is not limited thereto, but rather by the scope of the attached claims.

What is claimed is:

1. A thermochromic material-containing composition, comprising:
   a thermochromic material comprising a leuco dye, a developer and a solvent encapsulated in a shell, wherein the encapsulation comprises trioctanoin, wherein the thermochromic material is present in an amount from 0.1 part to about 6 parts based on 100 total parts by weight of the composition;
   a light scattering component, wherein the light scattering component is present in an amount from about 1 to about 10 parts based on 100 total parts by weight of the composition; and
   a matrix material, comprising an asphalt binder, wherein the thermochromic material has a transition temperature that ranges from about 25° C. to about 35° C., wherein the composition is a) a coating, b) a film, or c) further includes asphalt, and wherein the thermochromic material and the light scattering material are both dispersed within the matrix material.

2. The composition according to claim 1, wherein light scattering component includes one or more of titanium dioxide, ceramic particles, metal oxide particles and glass particles.

3. The composition according to claim 1, wherein the matrix material further comprises a polymer.

4. The composition according to claim 3, wherein the polymer is one or more of polyvinylchloride, polyurethane, acrylic, polyolefin, polycarbonate, polyacrylonitrile, polyvinylpyrrolidone, polystyrene, and polyvinyl alcohol.

5. The composition according to claim 1, wherein the transition temperature is from about 29° C. to about 33° C.

6. The composition according to claim 1, wherein the thermochromic material is microencapsulated.

* * * * *